(12) United States Patent
Thoreson

(10) Patent No.: US 6,477,911 B1
(45) Date of Patent: Nov. 12, 2002

(54) SHIFTING MECHANISM FOR A VEHICLE GEARBOX

(75) Inventor: Torsten Thoreson, Ytterby (SE)

(73) Assignee: Volvo Lastvagnar AB, Gothenburg (SE)

(*) Notice: Subject to any disclaimer, the term of this patent is extended or adjusted under 35 U.S.C. 154(b) by 0 days.

(21) Appl. No.: 09/744,747

(22) PCT Filed: Jul. 28, 1999

(86) PCT No.: PCT/SE99/01324
§ 371 (c)(1),
(2), (4) Date: Apr. 26, 2001

(87) PCT Pub. No.: WO00/06409
PCT Pub. Date: Feb. 10, 2000

(30) Foreign Application Priority Data

Jul. 29, 1998 (SE) .............................................. 9802644

(51) Int. Cl.[7] ................................................. G05G 5/28
(52) U.S. Cl. .................................... 74/473.21; 74/473.3
(58) Field of Search ......................... 74/473.3, 473.28, 74/473.21, 473.36

(56) References Cited

U.S. PATENT DOCUMENTS

| | | | | |
|---|---|---|---|---|
| 3,255,852 A | * | 6/1966 | Martin et al. ............. | 192/219.4 |
| 3,636,793 A | * | 1/1972 | Bieber ...................... | 74/473.1 |
| 3,710,904 A | * | 1/1973 | Boyer et al. ................ | 180/336 |
| 3,779,096 A | * | 12/1973 | Hurst et al. ............... | 74/473.22 |
| 3,987,686 A | * | 10/1976 | Paplaski ................... | 74/473.22 |
| 4,131,126 A | * | 12/1978 | Chromik .................... | 137/270 |
| 4,307,623 A | * | 12/1981 | Cavellero et al. ........... | 180/328 |
| 4,398,433 A | * | 8/1983 | Sonns ....................... | 74/473.21 |
| 4,664,221 A | * | 5/1987 | Loney et al. ............... | 172/793 |
| 5,156,061 A | * | 10/1992 | Ishizuki et al. ........... | 74/473.23 |
| 5,187,998 A | * | 2/1993 | Asano et al. ............... | 74/473.3 |
| 5,829,309 A | * | 11/1998 | Wagner et al. ............. | 74/473.1 |
| 5,878,623 A | * | 3/1999 | Teich ....................... | 74/100.1 |

FOREIGN PATENT DOCUMENTS

| | | |
|---|---|---|
| DE | 196 32859 | 2/1998 |
| EP | 0 176 682 | 4/1986 |
| EP | 0 421 948 | 4/1991 |

* cited by examiner

Primary Examiner—Thomas R. Hannon
Assistant Examiner—Julie K. Smith
(74) Attorney, Agent, or Firm—Young & Thompson

(57) ABSTRACT

Gear shift mechanism for a vehicle gearbox, comprising a gear lever (1, 7) pivotable between forward and rear end positions via an intermediate neutral position. A pivot element (22) is pivotable about an axis (c), which is located between and fixed relative to the pivot axis (a) of the gear lever and the lower end of the gear lever. A pair of springs (29) are set between the pivot element and said end of the gear lever so as to make up together with the pivot element an over center mechanism, which forces the gear lever towards either of the end positions.

8 Claims, 3 Drawing Sheets

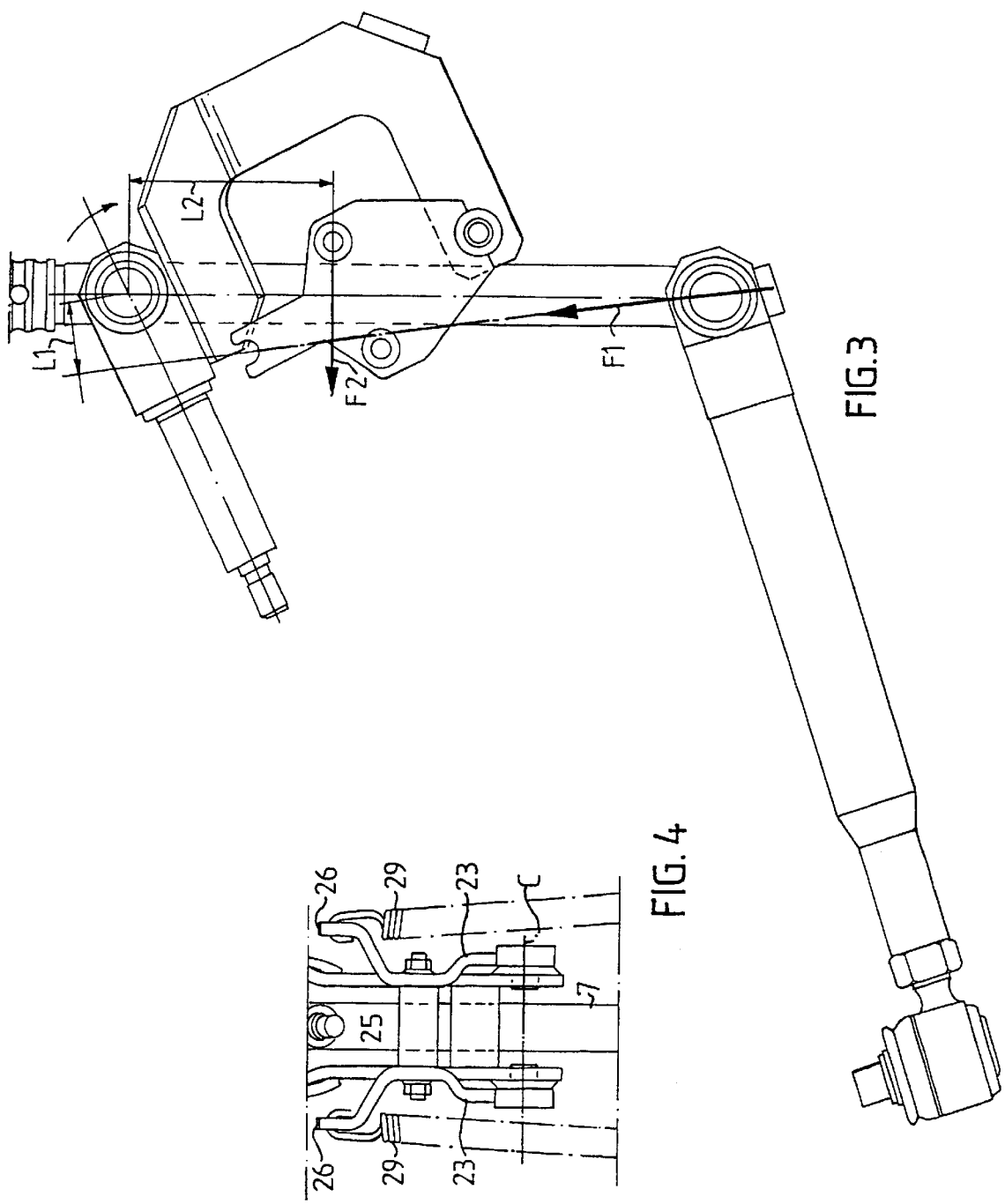

SHIFTING MECHANISM FOR A VEHICLE GEARBOX

Figure 1:
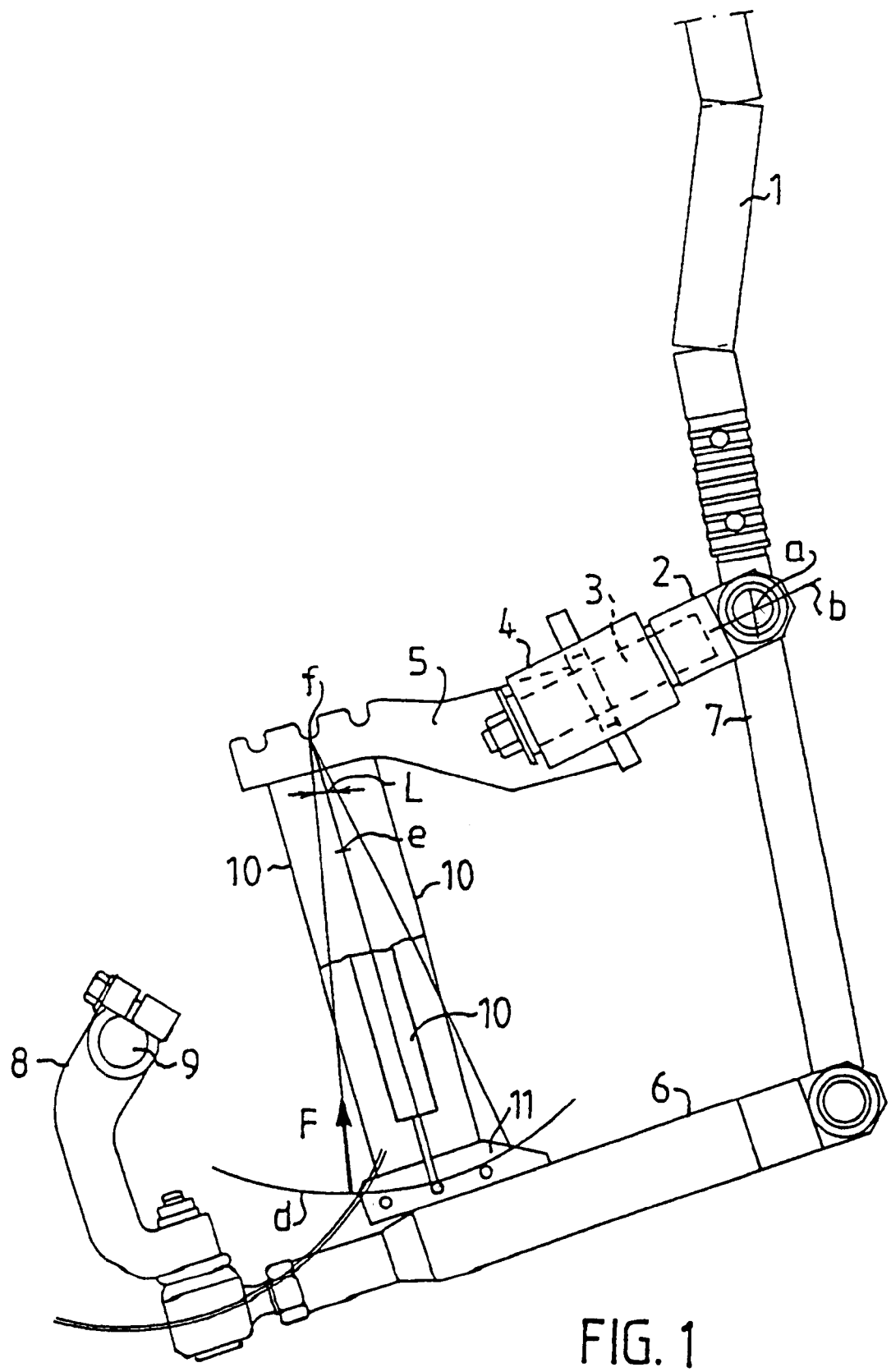

The present invention relates to a gear shift mechanism for a vehicle gearblx, comprising a gear lever, which is mounted for pivoting in a first plane between two end positions, and spring means, which in one lever position on one side of a predetermined neutral position between said end positions, loads the lever towards one end position, and on the other side of said neutral position loads the lever towards the other end position.

In modem motor vehicles, especially trucks with a cab spring-mounted relative to the chassis and consequently also relative to the engine and the gearbox, problems arise at times with shift disengagement when driving on uneven surfaces and during rapid retardation, i.e. the shift lever moves unintentionally from the selected gear position to the neutral position. This can be caused by mass forces in the shift mechanism or a large relative movement between the vehicle cab and the engine/gearbox. This causes the shift lever to be affected by disengaging forces from its sealing bellows fixed to the cab.

By providing the inner controls of the gearbox with blocking balls, shift disengagement can be counteracted to some extent, but this solution is in many cases insufficient since it provides too low blocking torque.

In a known shifting mechanism of the type described by way of introduction, an outer blocking mechanism in the form of three tensile springs, so-called "kick-over springs", which spring-load a shift bar joined to the shift lever towards one of the other end positions on either side of the shift lever neutral position. This solution is space-consuming, firstly, due to the fact that it requires as many as three springs and, secondly, due to the fact that the springs must be relatively long, i.e. longer than the radius of the arc along which the shift bar moves when the shift lever is moved between its end positions in the longitudinal direction of the vehicle, since the torque lever and thus the blocking torque is directed proportionally to the difference between the length of the springs and the radius of movement. For these reasons, the moment arm will be in many cases too short to provide a torque sufficient to prevent gear lever disengagement.

The purpose of the present invention is to achieve a shifting mechanism of the type described by way of introduction, which takes much less space in the longitudinal direction of the shift lever and which provides many times the torque counteracting gear shift disengagement than the above described gear shift mechanism with three long tensile springs.

This is achieved according to the invention by virtue of the fact that the spring means are fixed, firstly, to the lever or to an element joined to the lever at a distance from the pivot centre of the lever and, secondly, in an attachment point on a pivot element, which is so mounted for pivoting in a plane parallel to the pivot plane of the lever about a pivot centre fixed relative to the pivot centre of the lever, spaced from the attachment of the spring means in the lever, that abutment elements acting between the pivot element and the lever, when moving the shift lever from the neutral position, load the lever towards one or the other end position via the spring means.

By virtue of the invention there is achieved a very compact design with short springs. The torque can be controlled within wide limits in order to provide, as needed, high torque against shift lever disengagement. By selecting the proper pivot radius, spring force and placement of the pivot element, the shifting forces can be reduced maximally.

Figure 2:
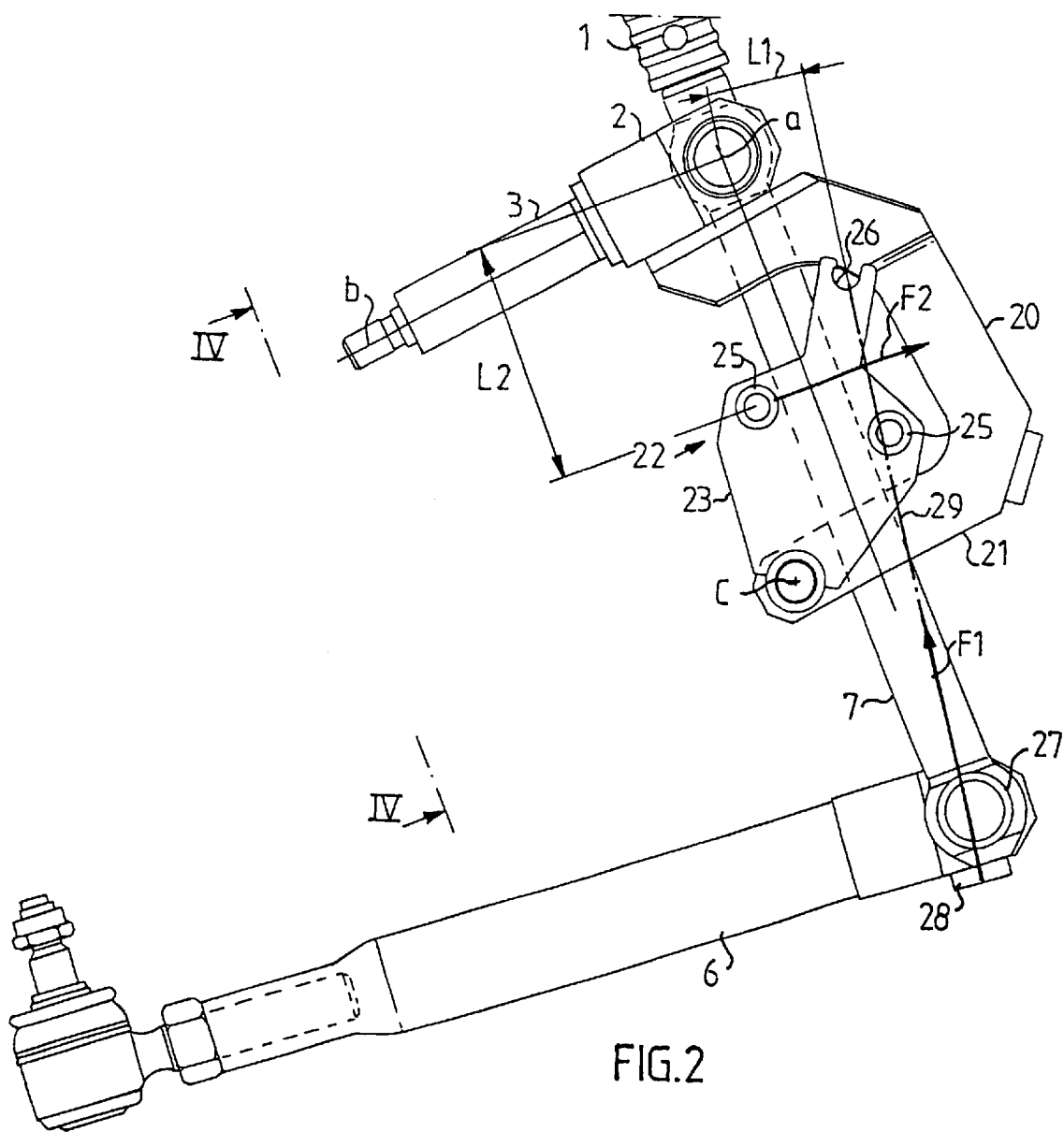

The invention will be described in more detail below with reference to examples shown in the accompanying drawings, where FIG. 1 shows a previously known shifting device of the type described by way of introduction, FIGS. 2 and 3 show a corresponding side view of one embodiment of a shifting device according to the invention in its respective shift positions, and FIG. 4 shows a view along the line IV—IV in FIG. 2.

1 in FIG. 1 designates a shift lever, which is journalled in a bearing bracket 2 for pivoting about a pivot axis a. The bearing bracket 2 is joined to a pin 3, which is journalled in a sleeve for rotation about a pivot axis b. The sleeve 4 is joined to a fixed bracket 5 in the vehicle. A shift bar 6 is articulated both with the lower section 7 of the shift lever and with an arm 8, which is non-rotatably joined to a rotatably and displaceable shaft 9 in a gearbox (not shown in more detail here). By turning or laterally displacing the shaft 9 from a neutral position, the different gears are engaged.

In the bracket 5, one end of each of three tensile springs 10 is attached, the other end of each spring being fixed in an attachment plate 11 solidly joined to the shift bar 6. Only the central spring 10 is shown in its entirety in FIG. 1, the others being indicated only by their centre lines. When the shift lever is moved between its forward and rear end positions, the shift bar describes a circular arc d, the rotational centre e of which lies below the pivot centre f of the central spring 10. A moment arm L is thereby obtained, which in a known installation with three springs 10 with a spring force F=3× 300 N=900 N amounted to 10.2 mm. This provided a torque against gear disengagement Mu=900×10.2=9180 Nmm, i.e. 9.2 Nm.

FIGS. 2–4 show en embodiment of a gear shift mechanism according to the invention. Details corresponding to those in FIG. 1 have been given the same reference numerals as in FIG. 1. The shift lever 1 is pivotally mounted in a bearing bracket 2 to pivot about an axis a. The bearing bracket 2 is joined to a pin 3, which is rotatably mounted in a sleeve (not shown) fixed in the vehicle. A pair of C-shaped brackets 20 are fixed to the bearing bracket 2. At the distal end of the lower leg 21 on each bracket 20 there is a pivot element 22 consisting of two plates 23 pivotally mounted for pivoting about an axis c. The pivot element plates 23 are joined to each other by means of a pair of spacer sleeves 25, between which the lower section 7 of the shift lever 1 extends. Between the upper ends 26 of the plates 23 of the pivot element and a transverse rib 28 joined to the bearing 27 of the shift bar 6 in the section 7 of the shift lever 1, a pair of tensile springs 29 are mounted, and are shown for the sake of illustration only marked with their centre lines in FIGS. 2 and 3.

In FIG. 2, the shift lever 1 is shown in a front end position in reference to the longitudinal direction of the vehicle, and in FIG. 3 in a rear end position. The tensile force in each spring 29 is marked with F1, and the resulting pressure force from the respective spacer sleeve 25 against the section 7 is indicated by F2. In an intermediate neutral position of the section 7 (not shown), in which the centre line of the tension springs 29 coincides with the centre line of the section 7, there is equilibrium and the section 7 is not loaded by the spacer sleeves 25.

A test embodiment had the following dimensions:

F1=2 springs×215 N=430 N
Moment arm L1=29.3 mm
F2=253 N
Moment arm L2=82.1 mm

Torque against shift disengagement, Mu:

$Mu_{tot}$=430×29.3+253×82.1=33400 Nmm=33.4 Nm

The torque per N of spring force will in this case be Mu/F=33.4/430=0.08 which is to be compared with the described known embodiment Mu/F=9.2/900=0.01.

It is thus evident that the embodiment according to the invention provides eight times higher torque in relation to the spring force than does the described known embodiment. This provides, in addition to a secure block against gear disengagement, a substantial reduction in the shifting force when engaging a gear speed. It is true that the disengaging force is also increased correspondingly, but this increase is of no importance since the disengaging force is still low relative to the engaging force, since no synchronizing work is carried out.

What is claimed is:

1. Gear shift mechanism for a vehicle gearbox, comprising a gear lever, which is mounted for pivoting in a first plane between two end positions, and spring means, which in one lever position on one side of a predetermined neutral position between said end positions, loads the lever towards one end position, and on the other side of said neutral position loads the lever towards the other end position, characterized in that the spring means (29) are fixed, firstly, to the lever (1,7) or to an element (28) joined to the lever at a distance from the pivot centre (a) of the lever and, secondly, in an attachment point (26) on a pivot element (22), which is so mounted for pivoting in a plane parallel to the pivot plane of the lever about a pivot centre (c) fixed relative to the pivot centre (a) of the lever, spaced from the attachment element of the spring means (29) in the lever, that abutment elements (25) acting between the pivot element and the lever, when moving the shift lever from the neutral position, load the lever towards one or the other end position via the spring means.

2. Gear shift mechanism according to claim 1, characterized in that the pivot centre (c) of the pivot element (22) is located between the pivot centre (a) of the shift lever (1,7) and the attachment element of the spring means (29) to the shift lever.

3. Gear shift mechanism according to claim 1, characterized in that the pivot element (22) comprises two parts (23), joined and spaced from each other, that the shift lever extends through the space formed between said parts, and that two abutment elements (25) joined to the pivot element extend into the space on either side of the gear lever, as seen in the pivot plane of the gear lever.

4. Gear shift mechanism according to claim 3, characterized in that the abutment elements (25) are formed of two cylindrical elements arranged on either side of the shift lever (1,7), and extend parallel to the pivot axis (c) of the pivot element and form spacer means between the two parts (23) of the pivot element.

5. Gear shift mechanism according to claim 3, characterized in that one end of a tensile spring (29) is tensioned in the respective pivot element part (23) at its end remote from its pivot centre (c).

6. Gear shift mechanism according to claim 1 characterized in that the shift lever (1,7) is mounted in a bearing bracket (2), which in turn is mounted for pivoting about an axis (b) perpendicular to the pivot axis (a) of the shift lever.

7. Gear shift mechanism according to claim 6, characterized in that the bearing bracket (2) is fixed to the upper leg of a C-shaped bracket (20), and that the pivot element (22) is pivotally mounted in the lower leg (21) of the bracket.

8. Gear shift mechanism according to claim 7, characterized in that the bracket is formed of two joined and spaced C-shaped bracket elements (20), to which the respective pivot element part (23) is pivotally mounted.

* * * * *